United States Patent
Oshitani et al.

(10) Patent No.: US 7,987,685 B2
(45) Date of Patent: Aug. 2, 2011

(54) REFRIGERANT CYCLE DEVICE WITH EJECTOR

(75) Inventors: Hiroshi Oshitani, Toyota (JP);
Hirotsugu Takeuchi, Nagoya (JP);
Yoshiaki Takano, Kosai (JP); Mika Gocho, Obu (JP)

(73) Assignee: Denso Corporation, Kariya (JP)

( * ) Notice: Subject to any disclaimer, the term of this patent is extended or adjusted under 35 U.S.C. 154(b) by 193 days.

(21) Appl. No.: 11/890,548

(22) Filed: Aug. 6, 2007

(65) Prior Publication Data

US 2008/0087040 A1 Apr. 17, 2008

(30) Foreign Application Priority Data

Aug. 11, 2006 (JP) .................................. 2006-219478

(51) Int. Cl.
*F25B 1/06* (2006.01)
(52) U.S. Cl. ................ 62/500; 62/170; 62/525; 62/506; 62/196.4
(58) Field of Classification Search ............... 62/500, 62/170, 525, 506, 196.4
See application file for complete search history.

(56) References Cited

U.S. PATENT DOCUMENTS

| | | | |
|---|---|---|---|
| 7,059,150 B2 * | 6/2006 | Komatsu et al. | 62/500 |
| 7,178,359 B2 | 2/2007 | Oshitani et al. | |
| 2004/0255610 A1 * | 12/2004 | Nishijima et al. | 62/500 |
| 2005/0155374 A1 * | 7/2005 | Oshitani et al. | 62/500 |
| 2005/0268644 A1 * | 12/2005 | Oshitani et al. | 62/500 |
| 2006/0288716 A1 * | 12/2006 | Knight et al. | 62/196.4 |

* cited by examiner

*Primary Examiner* — Cheryl J Tyler
*Assistant Examiner* — Jonathan Koagel
(74) *Attorney, Agent, or Firm* — Harness, Dickey & Pierce, PLC

(57) ABSTRACT

A refrigerant cycle device includes a branch portion for branching a flow of refrigerant discharged from a compressor, a first radiator for radiating one high-temperature and high-pressure refrigerant branched at the branch portion, an ejector including a nozzle portion for decompressing refrigerant on a downstream side of the first radiator, a second radiator for radiating the other high-temperature and high-pressure refrigerant branched at the branch portion, a throttle device for decompressing refrigerant on a downstream side of the second radiator, and a suction side evaporator for evaporating refrigerant downstream of the throttle device and for allowing the refrigerant to flow to an upstream side of a refrigerant suction port of the ejector. Furthermore, the first and second radiators are disposed downstream of the branch portion such that a heat radiation amount of refrigerant in the first radiator is smaller than that in the second radiator.

21 Claims, 6 Drawing Sheets

REFRIGERANT CYCLE DEVICE WITH EJECTOR

CROSS REFERENCE TO RELATED APPLICATION

This application is based on Japanese Patent Application No. 2006-219478 filed on Aug. 11, 2006, the contents of which are incorporated herein by reference in its entirety.

FIELD OF THE INVENTION

The present invention relates to a refrigerant cycle device having an ejector.

BACKGROUND OF THE INVENTION

JP-A-2005-308380 conventionally discloses a refrigerant cycle device in which a branch portion for branching the flow of refrigerant is disposed on the upstream side of a nozzle portion of an ejector and on the downstream side of a radiator for radiating heat from the refrigerant discharged from a compressor. One of the refrigerants branched flows into the nozzle portion side, while the other refrigerant flows into a refrigerant suction port of the ejector.

In this refrigerant cycle device, a first evaporator (an outflow-side evaporator) is disposed on the downstream side of a diffuser portion of the ejector, and a throttle mechanism and a second evaporator (a suction-side evaporator) are disposed between the branch portion and the refrigerant suction port of the ejector. Each evaporator allows the refrigerant to exhibit a heat absorption effect.

The ejector which is applied to this kind of refrigerant cycle device expands the refrigerant isentropically at the nozzle portion, thereby recovering the loss of kinetic energy in expansion. This energy recovered (hereinafter referred to as "recovered energy") is converted into pressure energy by the diffuser portion.

The refrigerant having a pressure increased by the diffuser portion is sucked into the compressor, thereby decreasing a driving power of the compressor, and thus achieving improvement of a cycle efficiency (COP). An ejector efficiency $\eta e$ indicative of energy conversion efficiency of the ejector is defined by the following formula 1:

$$\eta e = (1 + Ge/Gnoz) \times (\Delta P/\rho)/\Delta i \quad (F1)$$

where $Ge$ is the flow rate of refrigerant sucked from the refrigerant suction port of the ejector, $Gnoz$ is the flow rate of refrigerant passing through the nozzle portion of the ejector, $\Delta P$ is the amount of increase in pressure by the diffuser portion of the ejector, $\rho$ is the density of the refrigerant sucked from the refrigerant suction port, and $\Delta i$ is a difference in enthalpy between an inlet and an outlet of the nozzle portion.

Even when the dimension, shape, and the like of each component of the ejector are designed such that the ejector efficiency $\eta e$ becomes a desired value, as represented by the above-mentioned formula F1, the absolute amount of $\Delta P/\rho$, which is an index representing the pressure energy converted by the diffuser portion, cannot be increased unless the absolute amount of the enthalpy difference $\Delta i$, which is an index representing the recovered energy by the nozzle portion, is increased.

That is, unless the absolute amount of the enthalpy difference $\Delta i$ is increased, the absolute amount of increase in pressure $\Delta P$ cannot be increased at the predetermined ejector efficiency $\eta e$. Therefore, it is impossible to enhance the effect of improvement in the cycle efficiency (COP) by the increase in pressure of the refrigerant sucked into the compressor.

SUMMARY OF THE INVENTION

In view of the foregoing problems, it is an object of the invention to provide a refrigerant cycle device where the flow of refrigerant on the upstream side of a nozzle portion of an ejector is branched, which increases an amount of recovered energy in the nozzle portion thereby increasing an amount of increase in pressure of the refrigerant in a diffuser portion of the ejector.

According to an example of the present invention, a refrigerant cycle device includes: a compressor for compressing and discharging refrigerant; a branch portion for branching a flow of the refrigerant discharged from the compressor; a first radiator for radiating heat from one high-temperature and high-pressure refrigerant branched at the branch portion; an ejector including a nozzle portion for decompressing and expanding the refrigerant on a downstream side of the first radiator, a refrigerant suction port for sucking refrigerant by a high-velocity refrigerant flow ejected from the nozzle portion, and a diffuser portion for mixing the high-velocity refrigerant flow jetted from the nozzle portion and the refrigerant sucked from the refrigerant suction port and for increasing a pressure of the mixed refrigerant; a second radiator for radiating heat from the other high-temperature and high-pressure refrigerant branched at the branch portion; a throttle device for decompressing and expanding the refrigerant on a downstream side of the second radiator; and a suction side evaporator for evaporating the refrigerant on a downstream side of the throttle device and for allowing the refrigerant to flow to an upstream side of the refrigerant suction port. In the refrigerant cycle device, the first radiator and the second radiator are disposed on a downstream side of the branch portion such that an amount of heat radiated from the refrigerant in the first radiator is smaller than that in the second radiator.

Accordingly, it can increase the enthalpy of the refrigerant flowing into the nozzle portion, as compared to that of the refrigerant flowing into the throttle device.

Figure 2:
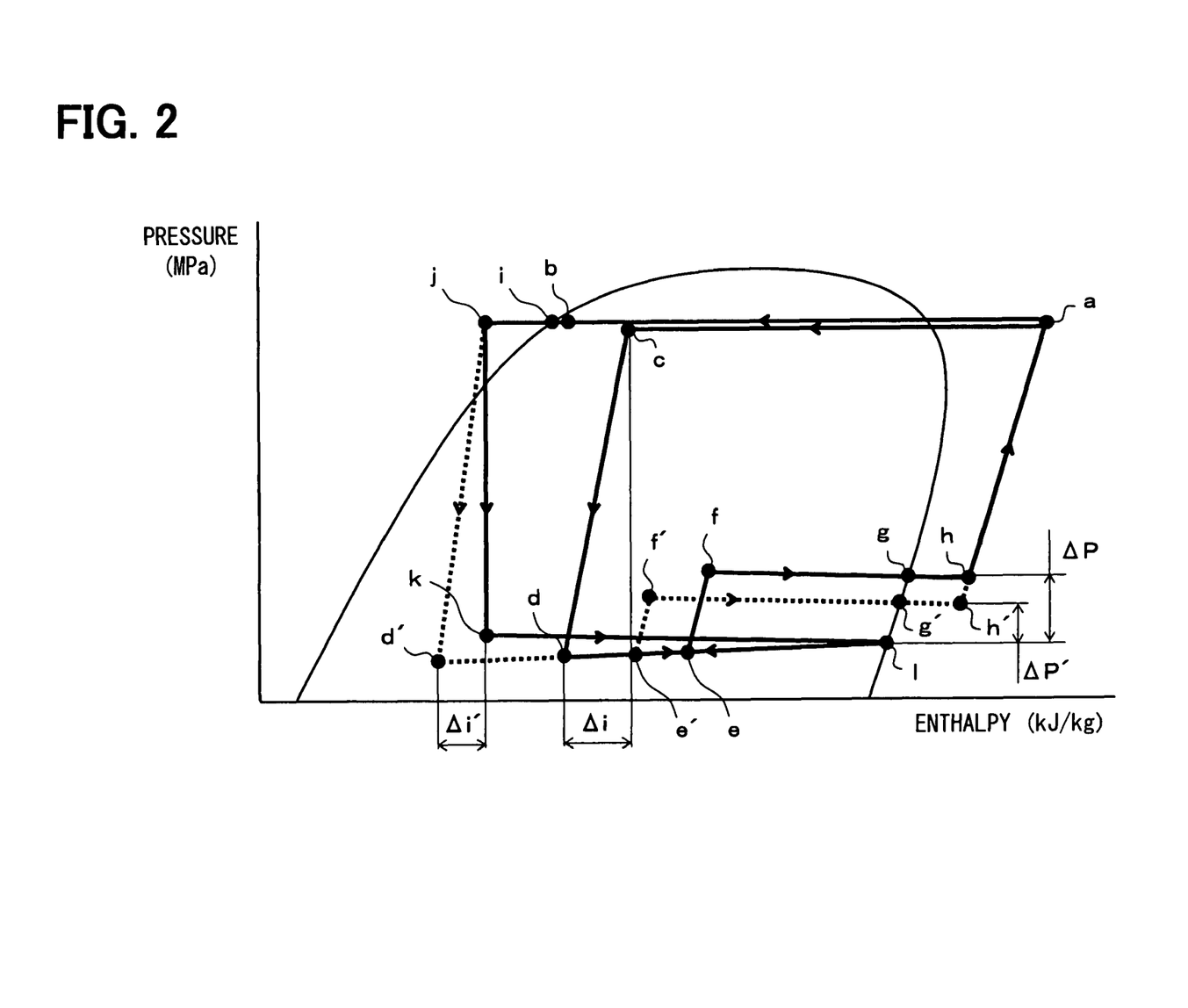
FIG. 2 is a Mollier diagram of a refrigerant cycle in the first embodiment.

When the enthalpy of the refrigerant on the inlet side of the nozzle portion is increased, as shown in FIG. 2; an amount of decrease in enthalpy of the refrigerant in isentropically expanding the refrigerant becomes large. That is, when the refrigerant is isentropically expanded over the nozzle portion of the ejector between the inlet and outlet of the ejector by the same pressure, the higher the enthalpy of the refrigerant on the inlet side of the nozzle portion, the larger a difference in enthalpy between the refrigerant on the inlet side of the nozzle portion and the refrigerant on the outlet side thereof, that is, a difference in enthalpy ($\Delta i$) between the inlet and outlet of the nozzle portion.

Thus, the dimension, shape, and the like of each component of the ejector in the above-mentioned refrigerant cycle device is designed such that the ejector efficiency represented by the above formula F1 becomes a desired value. Thus, the absolute amount of the difference in enthalpy, which is an index representing the recovered energy by the nozzle portion, is increased, so that the absolute amount of increase in pressure in the diffuser portion can be increased.

As a result, the effect of improvement of the cycle efficiency (COP) with the increase in pressure of the sucked refrigerant into the compressor can be enhanced in the refrigerant cycle device of the embodiment, as compared to a refrigerant cycle device including a branch portion disposed on the downstream side of a radiator.

When the enthalpy of the refrigerant on the inlet side of the nozzle portion is increased, the ratio (degree of dryness) of the vapor-phase refrigerant in the refrigerant on the inlet side of the nozzle portion is heightened. Thus, the density of refrigerant passing through the nozzle portion becomes small. The minimum passage area of the nozzle portion for decompressing the same flow rate of refrigerant as that in a case where the refrigerant on the inlet side of the nozzle portion is only the liquid-phase refrigerant can be set large. As a result, the nozzle portion can be easily processed, resulting in low process cost of the nozzle portion.

The vapor-phase refrigerant discharged from the compressor can be branched at the branch portion. For this reason, the branch portion can branch the refrigerant appropriately without being affected by gravity and a kinetic momentum of the refrigerant as compared to a case of branching vapor-liquid two-phase refrigerant.

In the above refrigerant cycle device, an area of a heat radiation portion of the first radiator for allowing the refrigerant to radiate heat is smaller than that of a heat radiation portion of the second radiator for allowing the refrigerant to radiate heat. Accordingly, it can easily obtain the structure in which the amount of heat radiated from the refrigerant in the first radiator is smaller than that in the second radiator.

Alternatively, the second radiator is a heat exchanger for exchanging heat between the refrigerant passing through an inside thereof and air passing through an outside thereof, and the first radiator is a heat exchanger for exchanging heat between the refrigerant passing through an inside thereof and the air after being heat-exchanged in the second radiator. In this case, because a difference in temperature between the refrigerant and air in the first radiator is smaller than that between the refrigerant and air in the second radiator, it can easily achieve the structure in which the amount of heat radiated from the refrigerant in the first radiator is smaller than that in the second radiator.

The refrigerant cycle device may be provided with an outflow-side evaporator for evaporating the refrigerant flowing out of the diffuser portion. Thus, the refrigerant can exhibit the heat absorption effect not only in the suction-side evaporator, but also in the outflow-side evaporator.

The refrigerant cycle device may be further provided with a vapor/liquid separator for separating the refrigerant on a downstream side of the diffuser portion into vapor-phase refrigerant and liquid-phase refrigerant to allow the vapor-phase refrigerant to flow to a suction side of the compressor, and a refrigerant passage for guiding the liquid-phase refrigerant to the downstream side of the throttle device and to an upstream side of the suction-side evaporator. Thus, both of the low-pressure refrigerant decompressed by the throttle device and the liquid-phase refrigerant from the vapor/liquid separator can be supplied to the suction-side evaporator. The low-pressure refrigerant in which the ratio of the liquid-phase refrigerant is high (that is, the refrigerant having a small degree of dryness) can be constantly supplied to the suction-side evaporator, so that the refrigerant can surely exhibit the heat absorption effect in the suction-side evaporator.

Furthermore, the refrigerant passage may be provided with a check valve for allowing the refrigerant to flow only from the vapor/liquid separator toward the suction-side evaporator. Furthermore, the refrigerant cycle device may be further provided with an internal heat exchanger for exchanging heat between the refrigerant to be sucked into the compressor and the refrigerant flowing from an outlet side of the second radiator. Accordingly, the refrigerant heat exchange in the internal heat exchanger can cool the refrigerant which is to flow into the suction-side evaporator, so that the difference in enthalpy of the refrigerant between the refrigerant inlet and outlet of the suction-side evaporator is increased, thereby increasing a refrigeration capacity of the cycle.

In the refrigerant cycle device, the branch portion, the first radiator, and the second radiator may be provided in an integrated structure. This enables reduction in mounting space for the refrigerant cycle device, and in manufacturing cost.

DETAILED DESCRIPTION OF THE PREFERRED EMBODIMENTS

First Embodiment

Figure 1:
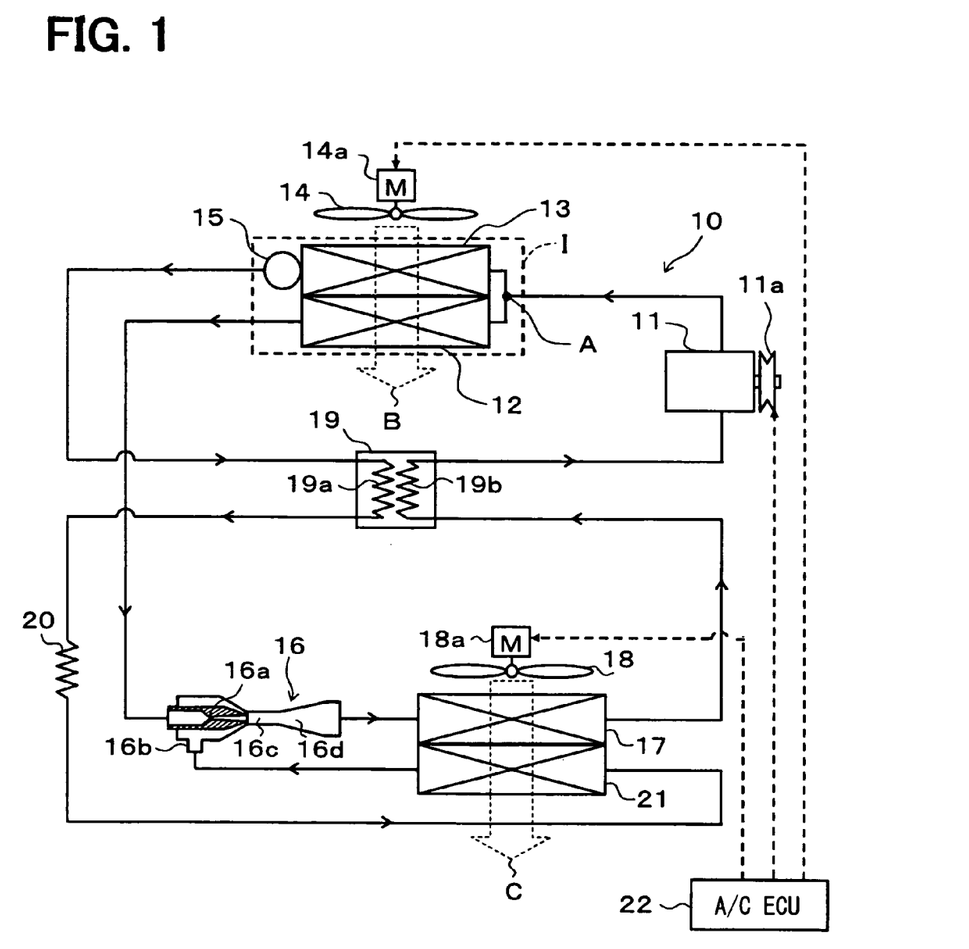
FIG. 1 is a schematic diagram showing a refrigerant cycle device according to a first embodiment of the invention.

A first embodiment of the invention will be described below with reference to FIGS. 1 to 3. FIG. 1 is a diagram showing an example of an entire structure of a refrigerant cycle device 10 according to the invention, which is applied to an air conditioner for a vehicle. In the refrigerant cycle device 10 of this embodiment, a compressor 11 for sucking and compressing the refrigerant is rotatably driven by an engine for vehicle running (not shown) via an electromagnetic clutch 11a, a belt, and the like.

The compressor 11 may be either a variable displacement compressor for being capable of adjusting a refrigerant discharge capacity by a change in discharge capacity. Alternatively, the compressor 11 may be a fixed displacement compressor for adjusting a refrigerant discharge capacity by changing an operating efficiency of a compressor operation by intermittent connection of the electromagnetic clutch 11a. The use of an electric compressor as the compressor 11 can adjust the refrigerant discharge capacity by adjustment of the number of revolutions of an electric rotary machine.

A branch portion A for branching the refrigerant flow is provided on a refrigerant discharge side of the compressor 11. Such the branch portion A can be easily made by a three-way joint or the like having one refrigerant inlet and two refrigerant outlets. One of the refrigerants branched at the branch portion A flows into a first radiator 12, and the other flows into a second radiator 13.

The first radiator 12 and the second radiator 13 each are heat exchangers for exchanging heat between the high-temperature and high-pressure refrigerant branched at the branch portion A and outside air (i.e., air outside a vehicle compartment) blown by a blower fan 14, thereby cooling the high-temperature and high-pressure refrigerant to dissipate heat therefrom. In this embodiment, a known fin and tube type heat exchanger is adopted as the above-described radiator.

More specifically, in each of the first radiator 12 and the second radiator 13, a number of refrigerant tubes through which the refrigerant flows are laminated vertically, fins are disposed between the adjacent refrigerant tubes for promoting heat exchange between the refrigerant and air, and header tanks are located to extend in a direction of lamination of the tubes for distributing and collecting the refrigerant. The header tanks are connected to both ends of the refrigerant tubes in a longitudinal direction of the refrigerant tubes.

In this embodiment, the numbers of the refrigerant tubes and fins of the first radiator 12 are smaller than those of the refrigerant tubes and fins of the second radiator 13. Thus, an area of a heat radiation portion (an area of a heat exchanging portion) of the first radiator 12 for allowing the refrigerant to radiate heat can be rendered smaller than that of a heat radiation portion (an area of a heat exchanging portion) of the second radiator 13 for allowing the refrigerant to radiate heat.

The blower fan 14 is an electric fan driven by an electric motor 14a. The electric motor 14a is rotatably driven by a control voltage output from an air conditioning controller 22 to be described later.

A receiver 15 constitutes a vapor/liquid separator for separating the refrigerant into liquid and vapor phases to store therein the liquid-phase refrigerant, and is disposed on the downstream side of the second radiator 13. The receiver 15 has a tank-like shape, and is adapted to separate the refrigerant into the liquid and vapor phases by a difference in density between these phases. A liquid-phase refrigerant outlet is provided at the bottom of the receiver 15, and allows the liquid-phase refrigerant separated to be sent out to the downstream side of the receiver 15.

In this embodiment, the branch portion A, the first radiator 12, the second radiator 13, and the receiver 15, which are located inside an area represented by a broken line I in FIG. 1, are assembled to an integrated structure. Specifically, the above-mentioned components 12, 13, and 15 are respectively made of aluminum, and integrally connected to each other by brazing.

Air blown by the blower fan 14 flows through the second radiator 13 and the first radiator 12 in the direction of arrow B. Thus, one high-pressure refrigerant branched at the branch portion A is cooled by the second radiator 13, and then the other high-pressure refrigerant branched at the branch portion A is cooled by the first radiator 12. That is, the first radiator 12 exchanges heat between the branched refrigerant and the air subjected to the heat exchange by the second radiator 13.

The refrigerant cycle device 10 of this embodiment constitutes a subcritical cycle which employs fluorocarbon refrigerant as the refrigerant, and in which the high-pressure side refrigerant pressure does not exceed the critical pressure of the refrigerant. In this case, the first radiator 12 and the second radiator 13 serve as a condenser for condensing the refrigerant.

A nozzle portion 16a of the ejector 16 is connected to the outlet side of the first radiator 12. The ejector 16 serves as decompression means for decompressing the refrigerant, and also as refrigerant circulation means for circulating the refrigerant by a suction effect of the refrigerant flow ejected at high velocity.

The ejector 16 includes the nozzle portion 16a for decompressing and expanding the high-pressure refrigerant isentropically by reducing a passage area of the high-pressure refrigerant flowing from the first radiator 12 to a small level. The ejector 16 also includes a refrigerant suction port 16b disposed in communication with a refrigerant jet port of the nozzle portion 16a for sucking the refrigerant from a suction-side evaporator 21 to be described later.

Furthermore, on the refrigerant flow downstream side of the nozzle portion 16a and the refrigerant suction port 16b, a mixing portion 16c is provided for mixing the high-velocity refrigerant flow ejected from the nozzle portion 16a and the suction refrigerant sucked from the refrigerant suction port 16b. A diffuser portion 16d serving as a pressure-increasing portion is located on the refrigerant flow downstream side of the mixing portion 16c.

The diffuser portion 16d is formed in such a shape that gradually enlarges the passage area of the refrigerant, and performs a function of decelerating the refrigerant flow so as to increase the refrigerant pressure, that is, a function of converting velocity energy of the refrigerant into pressure energy. An outflow-side evaporator 17 is connected to the outlet side of the diffuser portion 16d of the ejector 16.

The outflow-side evaporator 17 is an evaporator for exchanging heat between the low-pressure refrigerant flowing from the diffuser portion 16d and air (inside air or outside air) blown by the blower fan 18 to evaporate the low-pressure refrigerant, thereby exhibiting the heat absorption effect. The blower fan 18 is an electric fan driven by an electric motor 18a. The electric motor 18a is rotatably driven by the control voltage output from the air conditioning controller 22.

The refrigerant outlet side of the outflow-side evaporator 17 is connected to the inlet side of a low-pressure side refrigerant flow path 19b of an internal heat exchanger 19. The internal heat exchanger 19 exchanges heat between the high-pressure refrigerant flowing from the receiver 15 through a high-pressure side refrigerant flow path 19a, and the refrigerant on the suction side of the compressor 11 flowing through the low-pressure side refrigerant flow path 19b.

Various types of heat exchangers can be used as a specific example of the internal heat exchanger 19. In this embodiment, a double-tube type heat exchanger is used. Specifically, an inside pipe forming the low-pressure side refrigerant flow path 19b is disposed on the inner side of an outside pipe forming the high-pressure side refrigerant flow path 19a. The outlet side of the low-pressure side refrigerant flow path 19b is connected to the suction side of the compressor 11.

The outlet for the liquid-phase refrigerant of the receiver 15 is connected to an inlet of the high-pressure side refrigerant flow path 19a of the internal heat exchanger 19. A throttle device 20 is connected to the downstream side of the high-pressure side refrigerant flow path 19a. The throttle device 20 serves as throttle means for decompressing and expanding the refrigerant, while adjusting the flow rate of the refrigerant into the suction side evaporator 21. The throttle device 20 is constructed of a fixed throttle, such as a capillary tube or an orifice.

The suction-side evaporator 21 is connected to the downstream side of the throttle device 20. The suction-side evaporator 21 is an evaporator for exchanging heat between the low-pressure refrigerant flowing therethrough and the air blown by the blower fan 18 to evaporate the refrigerant, thereby obtaining the heat absorption effect. The refrigerant outlet side of the suction-side evaporator 21 is connected to the refrigerant suction port 16b.

In this embodiment, the outflow-side evaporator 17 and the suction-side evaporator 21 are assembled to an integrated structure. Specifically, the components of the outflow-side evaporator 17 and the suction-side evaporator 21 are made of aluminum and connected to the integrated structure by brazing.

Thus, the air blown by the above-mentioned blower fan 18 flows in the direction of arrow C, and is cooled by the outflow-side evaporator 17 and then by the suction-side evaporator 21. That is, the outflow-side evaporator 17 and the suction-side evaporator 21 can cool the same space to be cooled (inside the vehicle compartment).

The outline of an electric controller in this embodiment will be described below. The air conditioning controller 22

(A/C ECU) is constructed of a known microcomputer including a CPU, a ROM, and a RAM, and its peripheral circuit. The air conditioning controller 22 controls operations of various electric actuators 11a, 14a, 18a, and the like described above by performing various kinds of computations and processes based on control programs stored in the ROM.

The air conditioning controller 22 receives inputs of detection signals from various sensor groups (not shown), and various operation signals from an operation panel (not shown). Specifically, the sensor group includes an outside air sensor and the like for detecting the temperature of outside air (the temperature of air outside the compartment). The operation panel is provided with an operation switch for operating an air-conditioning refrigeration system for a vehicle, a temperature setting switch for setting the cooling temperature of the space to be cooled, and the like.

Now, the operation of the refrigerant cycle device of this embodiment with the above-mentioned structure will be described with reference to FIG. 2. FIG. 2 is a Mollier diagram schematically showing operation states of refrigerant in a refrigerant cycle of this embodiment.

When an air-conditioning operation switch on the operation panel is turned on in accordance with operation of the engine for vehicle running, the air conditioning controller 22 outputs control signals to various electric actuators 11a, 14a, 18a, and the like based on the control programs previously stored. Thus, the electromagnetic clutch 11a is connected to transfer a driving force from the engine for vehicle running to the compressor 11.

The compressor 11, to which the driving force is transferred, sucks, compresses, and discharges the refrigerant. The compressed state of the refrigerant at this time corresponds to a point "a" in FIG. 2. The high-temperature and high-pressure vapor-phase refrigerant discharged from the compressor 11 is branched at the branch portion A to flow into the first radiator 12 and the second radiator 13.

The refrigerant flowing from the branch portion A into the second radiator 13 exchanges heat with blown air (outside air) blown by the blower fan 14 to radiate heat (which corresponds to a change from the point "a" to a point "b" in FIG. 2). In contrast, the refrigerant flowing from the branch portion A into the first radiator 12 exchanges heat with air subjected to the heat exchange in the second radiator 13 after being blown by the blower fan 14 to radiate heat (which corresponds to a change from the point "a" to a point "c" in FIG. 2).

Since the area of the heat radiation portion in the first radiator 12 is made smaller than that of the heat radiation portion in the second radiator 13, as mentioned above, an amount of heat radiation from the refrigerant in the first radiator 12 is smaller than that of heat radiation from the refrigerant in the second radiator 13.

In the first radiator 12, the refrigerant exchanges heat with the blown air after being subjected to the heat exchange in the second radiator 13. A difference in temperature between the refrigerant and the blown air in the first radiator 12 is smaller than that between the refrigerant and the blown air in the second radiator 13. Thus, the amount of heat radiated from the refrigerant in the first radiator 12 is much smaller than that in the second radiator 13.

As a result, an enthalpy of the refrigerant on the outlet side of the first radiator 12 (corresponding to the point "c" in FIG. 2) is higher than that of the refrigerant on the outlet side of the second radiator 13 (corresponding to the point "b" in FIG. 2).

The refrigerant flowing from the first radiator 12 flows into the nozzle portion 16a of the ejector 16 to be decompressed and expanded isentropically (which corresponds to a change from the point "c" to a point "d" in FIG. 2). At the time of decompression and expansion, the pressure energy of the refrigerant is converted to the velocity energy, allowing the refrigerant to be ejected from the refrigerant jet port of the nozzle portion 16a at high velocity. The refrigerant having passed through the suction-side evaporator 21 is sucked from the refrigerant suction port 16b by using the refrigerant suction effect at the time of ejecting the refrigerant from the refrigerant jet port.

The ejected refrigerant ejected from the refrigerant jet port of the nozzle portion 16a is mixed with the suction refrigerant sucked from the refrigerant suction port 16b by a mixing portion 16c (which corresponds to a change from the point "d" to a point "e" in FIG. 2), and then flows into the diffuser portion 16d. The diffuser portion 16d converts the refrigerant velocity (expansion) energy into the pressure energy by enlarging the passage area of the refrigerant, so that the refrigerant pressure is increased (which corresponds to a change from the point "e" to a point "f" in FIG. 2).

The refrigerant flowing out of the diffuser portion 16d of the ejector 16 flows into the outflow-side evaporator 17, and absorbs heat from the blown air by the blower fan 18 to evaporate (which corresponds to a change from the point "f" to a point "g" in FIG. 2). Further, the refrigerant flowing out of the outflow-side evaporator 17 flows into the low-pressure side refrigerant flow path 19b of the internal heat exchanger 19, and exchanges heat with the high-pressure refrigerant passing through the high-pressure side refrigerant flow path 19a to be heated (which corresponds to a change from the point "g" to a point "h" in FIG. 2).

The vapor-phase refrigerant heated in the low-pressure side refrigerant flow path 19b of the internal heat exchanger 19 is sucked into and again compressed by the compressor 11 (which corresponds to a change from the point "h" to the point "a" in FIG. 2).

In contrast, the refrigerant flowing from the second radiator 13 into the receiver 15 is separated into the vapor-phase refrigerant and liquid-phase refrigerant (which corresponds to a change from the point "b" to a point "i" in FIG. 2). The liquid-phase refrigerant flowing out of the receiver 15 flows into the high-pressure side refrigerant flow path 19a of the internal heat exchanger 19, and exchanges heat with the refrigerant to be sucked into the compressor 11 through the low-pressure side refrigerant flow path 19b, so that the refrigerant at the outlet side of the high-pressure side refrigerant flow path is brought into a supercooled state (which corresponds to a change from the point "i" to a point "j" in FIG. 2).

The liquid-phase refrigerant on the downstream side of the high-pressure side refrigerant flow path 19a is decompressed isentropically by the throttle device 20 to become low-pressure refrigerant (which corresponds to a change from the point "j" to a point "k"). The low-pressure side refrigerant flows into the suction-side evaporator 21. The refrigerant flowing into the suction-side evaporator 21 absorbs heat from the air subjected to the heat exchange in the outflow-side evaporator 17 to evaporate (which corresponds to a change from the point "k" to a point "l" in FIG. 2). The vapor-phase refrigerant having passed through the suction-side evaporator 21 is sucked from the refrigerant suction port 16b into the ejector 16 (which corresponds to a change from the point "l" to the point "e" in FIG. 2).

As mentioned above, in the refrigerant cycle of this embodiment, the refrigerant on the downstream side of the diffuser portion 16d of the ejector 16 is supplied to the outflow-side evaporator 17, while the liquid-phase refrigerant flowing from the receiver 15 is supplied to the suction side evaporator 21 via the throttle device 20. Thus, the outflow-side evaporator 17 and the suction side evaporator 21 can effectively perform cooling functions at the same time.

Furthermore, the air blown from the blower fan 18 passes through the outflow-side evaporator 17 and the suction side evaporator 21 in this order, which can cool the same space to be cooled. At this time, a refrigeration evaporation pressure of the outflow-side evaporator 17 can be the pressure increased by the diffuser portion 16d. In contrast, since the suction side evaporator 21 is connected to the refrigerant suction port 16b, the refrigerant evaporation pressure of the suction-side evaporator 21 can be the lowest pressure obtained directly after the decompression by the nozzle portion 16a.

Therefore, the refrigeration evaporation pressure (refrigeration evaporation temperature) of the suction-side evaporator 21 can be lower than that of the outflow-side evaporator 17. As a result, a difference between the refrigerant evaporation temperatures of the outflow-side evaporator 17 and the suction-side evaporator 21 and the temperature of the blown air can be assured, thereby effectively cooling the blown air.

Since the downstream side of the outflow-side evaporator 17 is connected to the suction side of the compressor 11, the refrigerant having the pressure increased by the diffuser portion 16d can be sucked into the compressor 11. As a result, a suction pressure of the compressor 11 can be increased thereby to decrease the driving power of the compressor 11.

The effect of the internal heat exchanger 19 can enlarge the difference in enthalpy of the refrigerant between the inlet and outlet of the suction-side evaporator 21, thereby increasing a refrigeration capacity of the cycle. This can result in improved cycle efficiency (COP).

An amount of increase in pressure ΔP by the diffuser portion 16d in the refrigerant cycle device of this embodiment will be described below by comparing with a refrigerant cycle device shown in FIG. 3 (hereinafter referred to as a "refrigerant cycle of a comparison example"). The operation state of refrigerant in the refrigerant cycle of the comparison example is schematically shown by a broken line in the Mollier diagram shown in FIG. 2.

Figure 3:
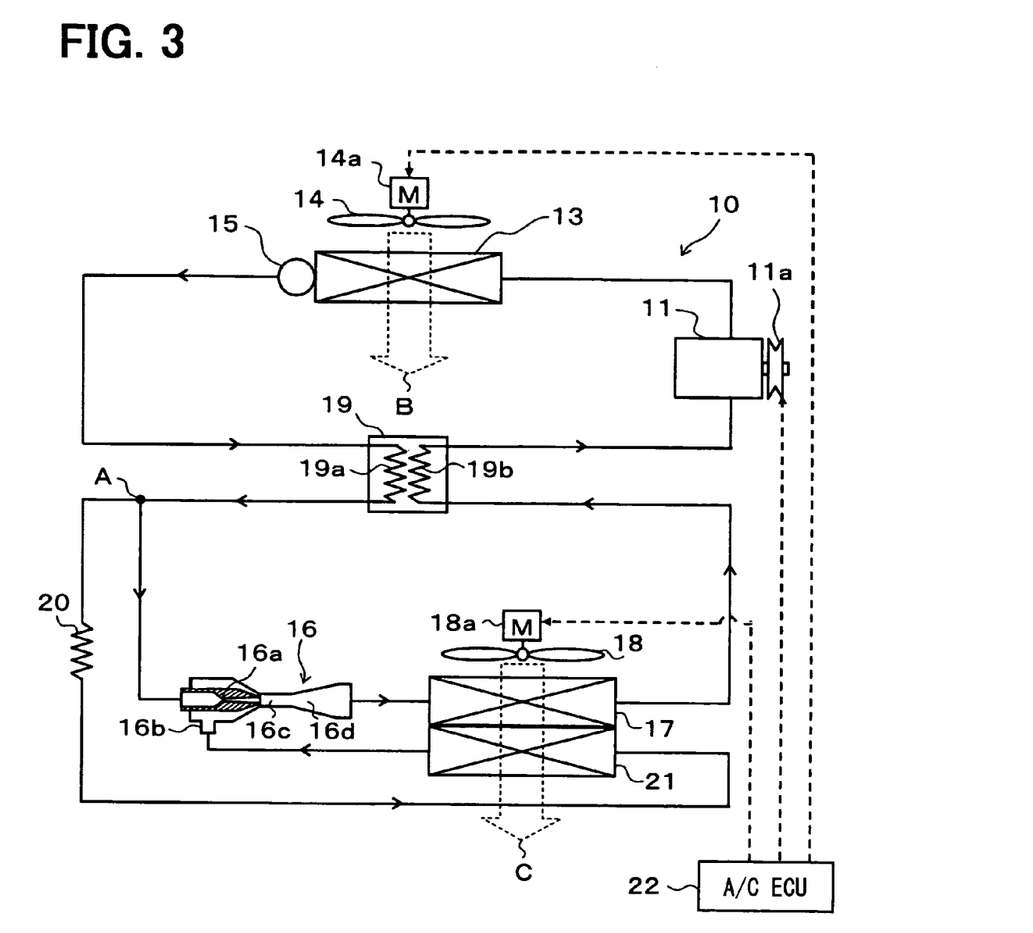
FIG. 3 is a schematic diagram of a refrigerant cycle device in a comparison example, which is compared with the first embodiment.

The cycle shown in FIG. 3 differs from the refrigerant cycle of this embodiment in that the first radiator 12 is removed and the branch portion A is located on the downstream side of the high-pressure side refrigerant flow path 19a of the internal heat exchanger 19, thereby allowing the refrigerant to flow from the branch portion A into the nozzle portion 16a and the throttle device 20.

That is, the refrigerant cycle of the comparison example is a cycle including the branch portion A disposed on the downstream side of the second radiator 13 and on the upstream side of the nozzle portion 16a for branching the refrigerant flow. The structures of other components are the same as those of this embodiment.

Now, the operation of the refrigerant cycle of the comparison example will be described. When the compressor 11 is driven by the vehicle engine, the compressor 11 sucks, compresses, and discharges the refrigerant. The high-temperature and high-pressure vapor-phase refrigerant discharged from the compressor 11 flows into the second radiator 13, and exchanges heat with outside air blown by the blower fan 14 to radiate heat. The liquid-phase refrigerant among the liquid-phase and vapor-phase refrigerants separated by the receiver 15 is cooled by the internal heat exchanger 19 to be branched at the branch portion A (which corresponds to a change from the point "a" to the point "i" and then to the point "j").

In the refrigerant cycle of the comparison example, an amount of blown air into the second radiator 13 is adjusted by the blower fan such that the operation state of the refrigerant on the outlet side of the second radiator 13 (which corresponds to the point "b" in FIG. 2) is the same as that of the refrigerant cycle of this embodiment. Further, a degree of heat exchange at the internal heat exchanger 19 is adjusted such that the operation state of the refrigerant on the outlet side of the high-pressure side refrigerant flow path 19a (which corresponds to the point "j" in FIG. 2) is the same as that of the refrigerant cycle of this embodiment.

In other words, either the operation state of the refrigerant flowing into the nozzle portion 16a of the ejector 16 or the operation state of the refrigerant flowing into the throttle device 20 in the refrigerant cycle of the comparison example is set to be the same as the operation state of the refrigerant on the outlet side of the high-pressure side refrigerant flow path 19a in the refrigerant cycle of this embodiment.

The refrigerant flowing from the branch portion A to the nozzle portion 16a of the ejector 16 is decompressed and expanded isentropically (which corresponds to a change from the point "j" to a point "d'" in FIG. 2) to be mixed with the suction refrigerant from the refrigerant suction port 16b at the mixing portion 16c (which corresponds to a change from the point "d'" to a point "e'" in FIG. 2).

The mixed refrigerant has its pressure increased by the diffuser portion 16d in the same way as in the refrigerant cycle of this embodiment, performs the function of heat absorption in the outflow-side evaporator 17, is heated by the internal heat exchanger 19, and is sucked into and compressed again by the compressor 11 (which corresponds to a change from the point "e'" to a point "f'", to a point "g'", and then to a point "h'" in FIG. 2).

The liquid-phase refrigerant flowing from the branch portion A into the throttle device 20 is decompressed by the throttle device 20 in the same way as in the refrigerant cycle of this embodiment, and has the heat absorption effect in the suction-side evaporator 21. Then, the refrigerant is sucked from the refrigerant suction port 16b and is mixed with the refrigerant ejected from the nozzle portion 16a in the mixing portion 16c (which corresponds to a change from the point "j" to the point "k", to the point "l", and then to the point "e'" in FIG. 2).

The amount of increase in pressure ΔP by the diffuser portion 16d in the refrigerant cycle of this embodiment is larger than the amount of increase in pressure ΔPd' by the diffuser portion 16d of the refrigerant cycle of the comparison example, as shown in FIG. 2. Accordingly, the refrigerant cycle of this embodiment can highly improve the cycle efficiency (COP) as compared to the refrigerant cycle of the comparison example.

In the refrigerant cycle of this embodiment, the amount of heat radiated from the refrigerant in the first radiator 12 is smaller than that in the second radiator 13, so that the enthalpy of the refrigerant on the inlet side of the nozzle portion 16a of the ejector 16 is increased as compared to the enthalpy of the refrigerant on the inlet side of the nozzle portion 16a of the refrigerant cycle of the comparison example.

When the enthalpy of the refrigerant on the inlet side of the nozzle portion 16a is increased, the gradient of an isentropic curve becomes gentle as shown in FIG. 2. Thus, an amount of decrease in enthalpy in isentropically expanding of the refrigerant becomes large.

That is, when the refrigerant is isentropically expanded over the nozzle portion 16a of the ejector 16 between the inlet and outlet thereof by the same pressure, the higher the enthalpy of the refrigerant on the inlet side of the nozzle portion 16a, the larger a difference in enthalpy Δi between the refrigerant on the inlet side of the nozzle portion 16a and the refrigerant on the outlet side of the nozzle portion 16a (that is, a difference in enthalpy between the inlet and outlet of the nozzle portion 16a).

Specifically, as shown in FIG. 2, the absolute amount of the difference in enthalpy Δi between the inlet and outlet of the nozzle portion 16a of the refrigerant cycle in this embodiment is large as compared to that of the difference in enthalpy Δi' in the refrigerant cycle of the comparison example.

When the absolute amount of the difference in enthalpy Δi between the inlet and outlet of the nozzle portion 16a becomes large, the dimension, shape, and the like of each component of the ejector 16 are designed such that the ejector efficiency ηe takes a predetermined value as indicated by the formula F1, whereby the absolute amount of increase in pressure ΔP in the diffuser portion 16d can be increased.

As a result, the refrigerant cycle of this embodiment can decrease the driving power of the compressor 11 by enlarging the absolute amount of increase in pressure ΔP in the diffuser portion 16d. This can highly improve the cycle efficiency (COP) as compared to in the refrigerant cycle of the comparison example.

When the enthalpy of the refrigerant on the inlet side of the nozzle portion 16a is increased, the rate of the vapor-phase refrigerant (degree of dryness) in the refrigerant on the inlet side of the nozzle portion 16a can be enhanced as compared to in the refrigerant cycle of the comparison example, as shown in FIG. 2.

When the rate of the vapor-phase refrigerant in the refrigerant on the inlet side of the nozzle portion 16a is high, the density of refrigerant passing through the nozzle portion 16a becomes small. Thus, the minimum passage area of the nozzle portion 16a for decompressing the same flow rate of refrigerant as that in a case where the refrigerant on the inlet side of the nozzle portion 16a is only the liquid-phase one can be designed to be large. As a result, the nozzle portion 16a can be easily processed, resulting in low process cost of the nozzle portion 16a.

In the refrigeration cycle of this embodiment, since the vapor-phase refrigerant discharged from the compressor 11 can be branched at the branch portion A, the branch portion A can branch the refrigerant appropriately without being affected by gravity and a kinetic momentum of the refrigerant as compared to a case of branching vapor-liquid two-phase refrigerant. As a result, the flow amounts of the refrigerant flowing from the branch portion A into the first radiator 12 and the refrigerant flowing from the branch portion A into the second radiator 13 can be controlled approximately.

Second Embodiment

Figure 4:
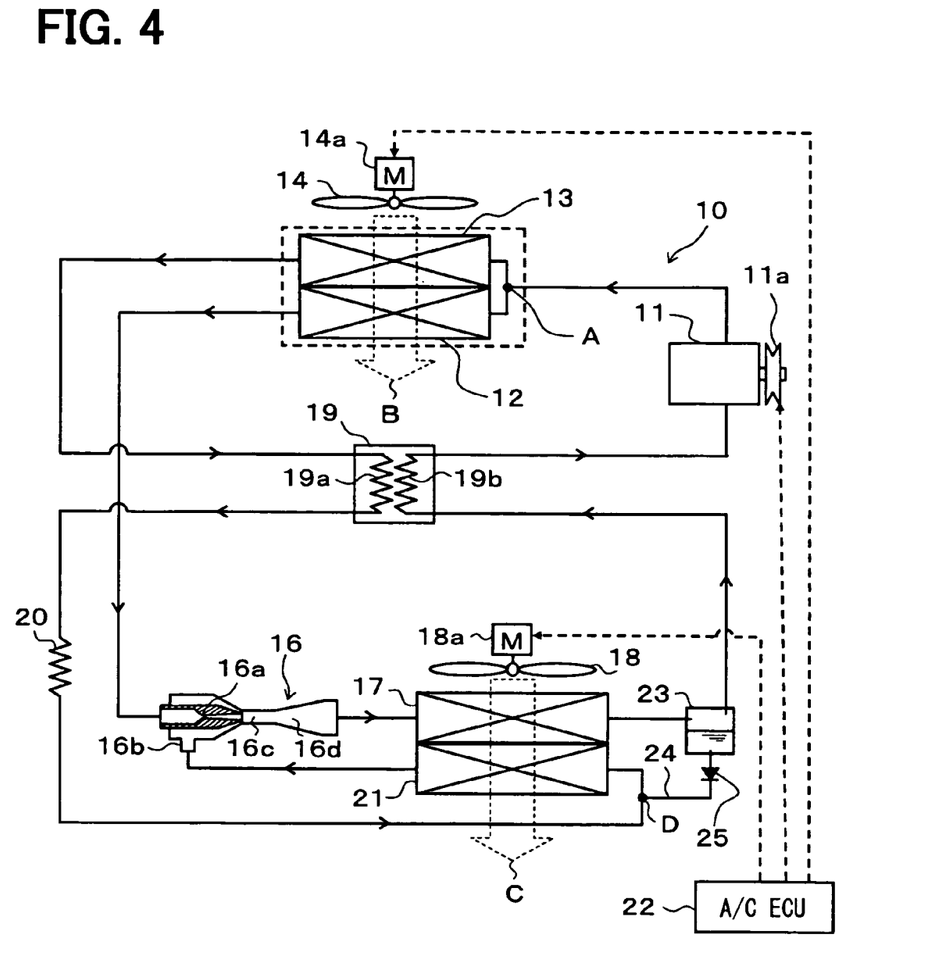
FIG. 4 is a schematic diagram showing a refrigerant cycle device according to a second embodiment.

In the above first embodiment, the receiver 15 is disposed on the downstream side of the second radiator 14. However, in a second embodiment, as shown in FIG. 4, the receiver 15 is removed, and an accumulator 23 is disposed on the downstream side of the outflow-side evaporator 17. The accumulator 23 is a vapor/liquid separator for separating the low-pressure refrigerant on the downstream side of the outflow-side evaporator 17 into the vapor-phase refrigerant and liquid-phase refrigerant to store therein the liquid-phase refrigerant.

The accumulator 23 has a tank-like shape, and is adapted to separate the refrigerant into the liquid and vapor phases by a difference in density between these phases. The accumulator 23 allows the vapor-phase refrigerant from a vapor-phase refrigerant outlet provided in an upper portion thereof to flow into the suction side of the compressor 11, and the liquid-phase refrigerant from a liquid-phase refrigerant outlet provided at the bottom thereof to flow out into a refrigerant passage 24.

The other end of the refrigerant passage 24 is connected to a joining portion D between the downstream side of the throttle device 20 and the upstream side of the suction side evaporator 21. A check valve 25 for allowing the refrigerant to flow only from the accumulator 23 to the joining portion D side is disposed in the refrigerant passage 24. The structures of other components of the refrigerant cycle are the same as those of the first embodiment.

Figure 5:
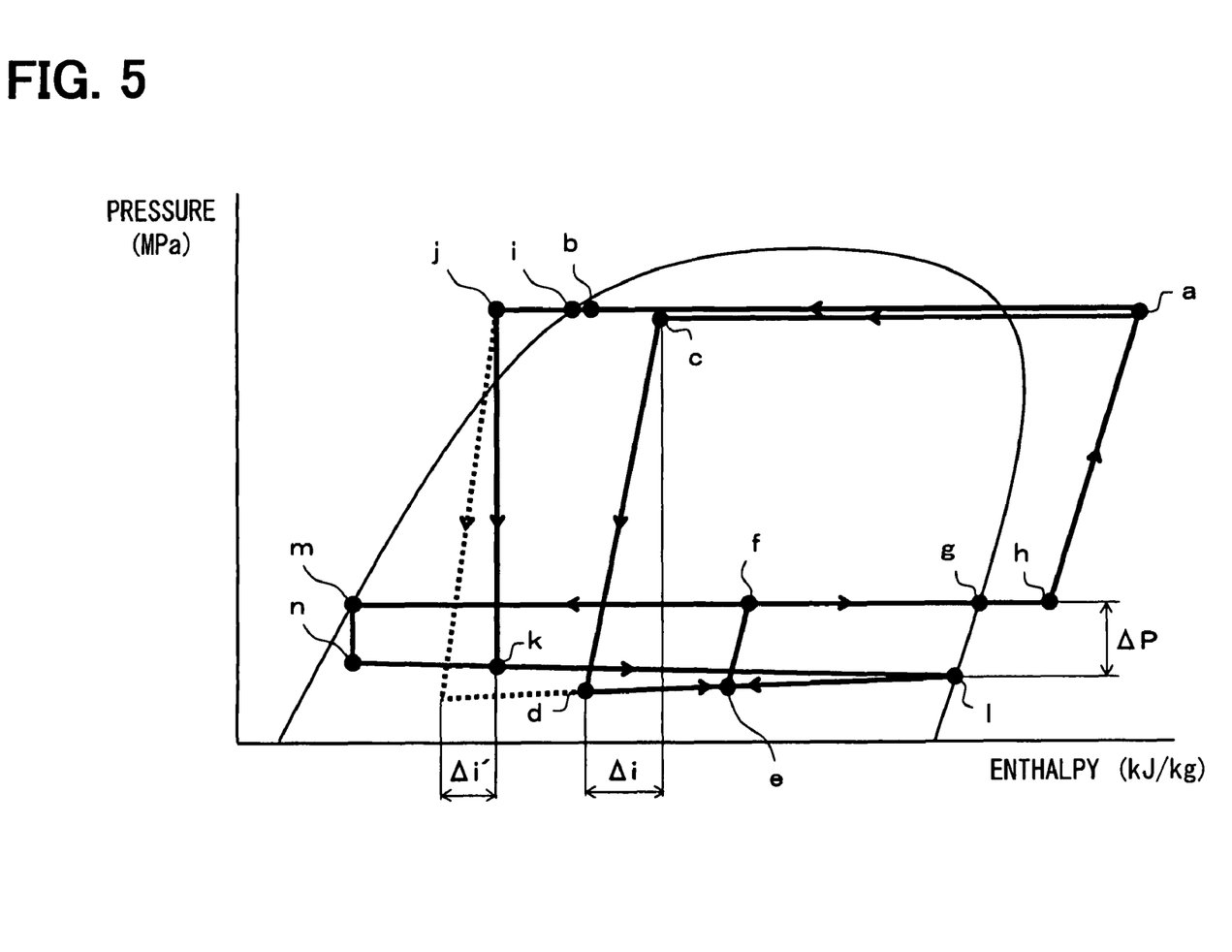
FIG. 5 is a Mollier diagram of a refrigerant cycle in the second embodiment.

Now, the operation of the above-mentioned refrigerant cycle structure in this embodiment will be described below. The operation state of refrigerant in the refrigerant cycle of this embodiment will be schematically shown by a solid line in a Mollier diagram of FIG. 5. In FIG. 5, the same reference characters denote the same operation states as those shown in FIG. 2.

When the compressor 11 is driven by the vehicle engine, for example, the compressor 11 compresses, and discharges the refrigerant. The high-temperature and high-pressure vapor-phase refrigerant discharged from the compressor 11 (which corresponds to the point "a" in FIG. 5) is branched at the branch portion A, and flows into the first radiator 12 and the second radiator 13.

Like the first embodiment, the refrigerant flowing from the branch portion A into the first radiator 12 exchanges heat with air (outside air) after being heat-exchanged in the second exchanger 13 to radiate heat. The refrigerant from the first radiator 12 flows into the nozzle portion 16a of the ejector 16 to be decompressed and expanded isentropically, and is mixed with the suction refrigerant sucked from the refrigerant suction port 16b at the mixing portion 16c (which corresponds to a change from the point "a" to the point "c", to the point "d", and then to the point "e" in FIG. 5).

The mixed refrigerant has its pressure increased by the diffuser portion 16d, flows into the outflow-side evaporator 17 to perform heat absorption in the outflow-side evaporator 17, and flows into the accumulator 23 to be separated into vapor and liquid phases (which corresponds to a change from the point "e" to the point "f" and then to the point "g" in FIG. 5). The vapor-phase refrigerant flowing from the accumulator 23 (which corresponds to the point "g" in FIG. 5) is heated by the internal heat exchanger 19, and sucked and compressed again by the compressor 11 (which corresponds to a change from the point "g" to the point "h", and to the point "a" in FIG. 5).

The refrigerant flowing from the branch point A into the second radiator 13 exchanges heat with air (outside air) blown from the blower fan to radiate heat, like the first embodiment. The refrigerant is then cooled by the internal heat exchanger 19, decompressed and expanded by the throttle device 20, and performs the heat absorption in the suction side evaporator 21 (which corresponds to a change from the point "a" to the point "b", to the point "i", to the point "j", to the point "k", and to the point "l" in FIG. 5).

The liquid-phase refrigerant separated by the accumulator 23 (which corresponds to a point "m" in FIG. 5) flows from the joining portion D into the suction-side evaporator 21 via the refrigerant passage 24 to perform the heat absorption (which corresponds to a change from the point "m" to a point "n", to the point "k", and to the point "l" in FIG. 5). The decrease in pressure of the refrigerant, which corresponds to a change from the point "m" to the point "n" in FIG. 5, is a loss of pressure of the refrigerant passing through the refrigerant passage 24 and the check valve 25.

The refrigerant discharged from the suction-side evaporator 21 is sucked from the refrigerant suction port 16b, and then mixed with the refrigerant ejected from the nozzle portion 16a at the mixing portion 16c (which corresponds to a change from the point "l" to the point "e" in FIG. 5).

Also in the refrigerant cycle of this embodiment, the branch portion A is disposed on the upstream side of the first radiator 12 and the second radiator 13, so that the amount of heat radiated from the refrigerant in the first radiator 12 is smaller than that in the second radiator 13. Thus, the refrigerant cycle of this embodiment can increase the enthalpy of refrigerant on the inlet side of the nozzle portion 16a as compared to the refrigerant cycle of the comparison example in which the branch portion A is disposed on the downstream side of the second radiator 13 and on the upstream side of the nozzle portion 16a.

As a result, the difference in enthalpy Δi of the refrigerant between the inlet and outlet of the nozzle portion 16a can be enlarged, thereby highly improving the cycle efficiency (COP), like the first embodiment.

Furthermore, since the accumulator 23 is provided in this embodiment, both of the liquid-phase refrigerant separated by the accumulator 23 and the vapor-liquid two-phase refrigerant having passed through the throttle device 20 can be supplied to the suction-side evaporator 21. As a result, the refrigerant in which the rate of the liquid-phase refrigerant is high (that is, the refrigerant having a small degree of dryness) can be constantly supplied stably to the suction-side evaporator 21, which can contribute to the improvement of performance of the second evaporator 19.

Provision of the check valve 25 can surely prevent the vapor-liquid two-phase refrigerant having passed through the throttle device 20 from directly flowing into the low-pressure side vapor/liquid separator 23.

Third Embodiment

Figure 6:
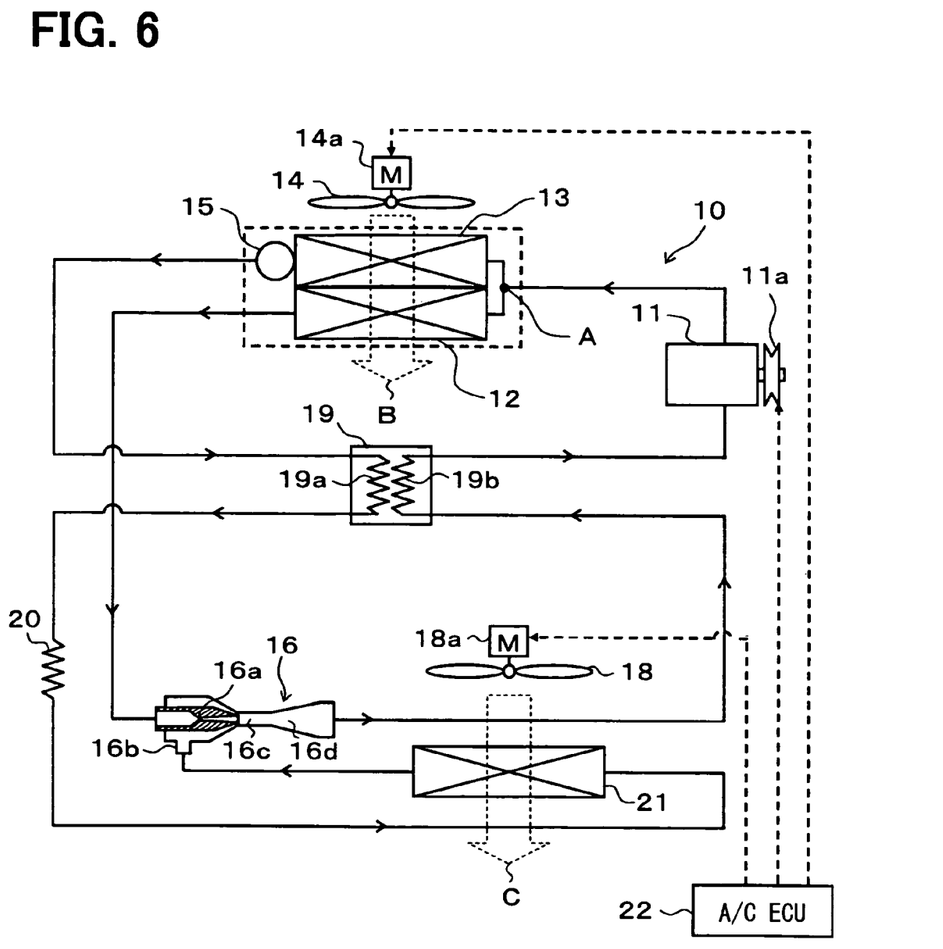
FIG. 6 is a schematic diagram showing a refrigerant cycle device according to a third embodiment.

FIG. 6 is a diagram of an entire structure of a refrigerant cycle device according to a third embodiment of the invention. The third embodiment differs from the first embodiment in that the outflow-side evaporator 17 is not provided. The structures of other elements of this embodiment are the same as those of the first embodiment.

Also in the refrigerant cycle of the third embodiment, the branch portion A is disposed on the upstream side of the first radiator 12 and the second radiator 13, so that the amount of heat radiated from the refrigerant in the first radiator 12 is smaller than that in the second radiator 13. Thus, the refrigerant cycle of this embodiment can increase the enthalpy of refrigerant on the inlet side of the nozzle portion 16a as compared to the refrigerant cycle of the comparison example in which the branch portion A is disposed on the downstream side of the second radiator 13 and on the upstream side of the nozzle portion 16a.

As a result, like the first embodiment, the absolute amount of the difference in enthalpy Δi of the refrigerant between the inlet and outlet of the nozzle portion 16a can be enlarged, thereby enlarging the absolute amount of increase in pressure ΔP of the diffuser portion 16d, and highly improving the cycle efficiency (COP).

Other Embodiments

The invention is not limited to the above-mentioned embodiments, and various modifications can be made to the disclosed embodiments.

(1) Although in each of the above embodiments, a fixed ejector having the nozzle portion 16a with a constant refrigerant passage area is used as the ejector 16, a variable ejector including a variable nozzle portion in which its refrigerant passage area is changeable may be used as the ejector 16.

In a specific example, the variable nozzle portion may be a mechanism in which a needle is inserted into a refrigerant passage of the variable nozzle portion, and a position of the needle is displaced by an electric actuator (for example, a motor actuator, such as a stepping motor, or an electromagnetic solenoid mechanism) to adjust the refrigerant passage area.

Specific control of the electric actuator includes, for example, detection means for detecting the temperature and pressure of the refrigerant on the outlet side of the outflow-side evaporator 17 in the first embodiment. The air conditioning controller 22 is adapted to calculate a degree of superheat of the refrigerant on the outlet side of the outflow-side evaporator 17 based on detected values, and to output a control signal to the electric actuator such that the superheat degree is in a predetermined target range.

(2) In the above embodiments, the receiver 15 is disposed on the downstream side of the second radiator 13. As the second radiator 13, may be used a so-called subcool type condenser, which includes: a heat exchanging portion for condensation adapted to cool and condense the refrigerant; the receiver 15 for separating the refrigerant introduced from the heat exchanging portion for condensation into vapor and liquid phases, and another heat exchanging portion for supercooling adapted to supercool saturated liquid-phase refrigerant from the receiver 15.

(3) In each of the above embodiments, the internal heat exchanger 19 is provided for exchanging heat between the refrigerant to flow into the throttle device 20 and the refrigerant on the suction side of the compressor 11. The invention may be applied to a refrigerant cycle device in which the internal heat exchanger 19 is not provided.

(4) In each of the above embodiments, the numbers of the tubes and fins of the first radiator 12 are decreased as compared to those of the second radiator 13, so that the amount of heat radiated from the refrigerant in the first radiator 12 is smaller than that in the second radiator 13. Alternatively, other means may be used to achieve the same function. For example, the size of the first radiator 12 is decreased as compared to that of the second radiator 13. Specifically, an area of a heat exchanging portion of the first radiator 12 may be smaller than that of a heat exchanging portion of the second radiator 13. For example, the first radiator 12 and the second radiator 13 are the same in the numbers of the tubes and fins, while the lengths of the tubes and fins of the first radiator 12 may be set shorter than those of the tubes and fins of the second radiator 13.

(5) Although each of the above embodiments describes the refrigerant cycle provided with the internal heat exchanger 19 and the throttle device 20, the throttle device 20 may be omitted and the high-pressure side refrigerant flow path 19a of the internal heat exchanger 19 may be used to have decompression function. Specifically, the high-pressure side refrigerant flow path 19a may be constructed of a capillary tube, and exchange heat between the refrigerant passing therethrough and the refrigerant passing through the low-pressure side flow path 19b, while decompressing the refrigerant.

(6) In each of the above embodiments, the throttle device 20 is constructed of a fixed restrictor, but a variable throttle mechanism whose refrigerant passage area can be changed electrically and/or mechanically may be used as the throttle device 20.

(7) It is apparent that although each of the above embodiments describes the refrigeration cycle for a vehicle, the invention can be applied not only to the refrigeration cycle for a vehicle, but also a fixed refrigeration cycle and the like in the same way.

(8) Although in each example of the above embodiments, fluorocarbon refrigerant is adopted as the refrigerant, HC-based refrigerant or carbon dioxide may be adopted.

(9) In each of the above embodiments, the first radiator 12 and the second radiator 13 are applied as an outdoor heat exchanger for exchanging heat between the refrigerant and the outside air, and the outflow-side evaporator 17 and the suction-side evaporator 21 are applied for cooling a compartment of a vehicle as an indoor heat exchanger. Conversely, the refrigerant cycle device of the invention may be applied to a heat pump cycle. In the heat pump cycle, the outflow-side evaporator 17 and the suction-side evaporator 21 may be constructed as the outside heat exchanger for absorbing heat from a heat source, such as outside air, or the like, and the first radiator 12 and the second radiator 13 may be constructed as the indoor heat exchanger for heating fluid to be heated, such as air or water.

Such changes and modifications are to be understood as being within the scope of the present invention as defined by the appended claims.

What is claimed is:

1. A refrigerant cycle device, comprising:
   a compressor for compressing and discharging refrigerant;
   a branch portion for branching a flow of the refrigerant discharged from the compressor;
   a first radiator for radiating heat from a first high-temperature and high-pressure refrigerant branched at the branch portion;
   an ejector including a nozzle portion for decompressing and expanding the refrigerant on a downstream side of the first radiator, a refrigerant suction port for sucking refrigerant by a high-velocity refrigerant flow ejected from the nozzle portion, and a diffuser portion for mixing the high-velocity refrigerant flow jetted from the nozzle portion and the refrigerant sucked from the refrigerant suction port and for increasing a pressure of the mixed refrigerant;
   a second radiator for radiating heat from a second high-temperature and high-pressure refrigerant branched at the branch portion;
   a throttle device for decompressing and expanding the refrigerant on a downstream side of the second radiator;
   first refrigerant piping through which the refrigerant flowing out of the first radiator flows into the nozzle portion;
   second refrigerant piping through which the refrigerant flowing out of the second radiator flows into the throttle device, the second refrigerant piping being provided independently from the first refrigerant piping and beginning at an outlet of the second radiator; and
   a suction side evaporator for evaporating the refrigerant on a downstream side of the throttle device and for allowing the refrigerant to flow to an upstream side of the refrigerant suction port; wherein
   the first radiator and the second radiator are disposed on a downstream side of the branch portion such that an amount of heat radiated from the refrigerant in the first radiator is smaller than that in the second radiator; and
   the first radiator is configured to cool the refrigerant flowing therein such that the refrigerant at a refrigerant outlet of the first radiator is in a gas-liquid two-phase state and the refrigerant in the gas-liquid two-phase state flows into the nozzle portion.

2. The refrigerant cycle device according to claim 1, wherein an area of a heat radiation portion of the first radiator for allowing the refrigerant to radiate heat is smaller than that of a heat radiation portion of the second radiator for allowing the refrigerant to radiate heat.

3. The refrigerant cycle device according to claim 1,
   wherein the second radiator is a heat exchanger for exchanging heat between the refrigerant passing through an inside thereof and air passing through an outside thereof, and
   wherein the first radiator is a heat exchanger for exchanging heat between the refrigerant passing through an inside thereof and the air after being heat-exchanged in the second radiator.

4. The refrigerant cycle device according to claim 1, further comprising an outflow-side evaporator for evaporating the refrigerant flowing out of the diffuser portion.

5. The refrigerant cycle device according to claim 1, further comprising:
   a vapor/liquid separator for separating the refrigerant on a downstream side of the diffuser portion into vapor-phase refrigerant and liquid-phase refrigerant to allow the vapor-phase refrigerant to flow to a suction side of the compressor; and
   a refrigerant passage for guiding the liquid-phase refrigerant to the downstream side of the throttle device and to an upstream side of the suction-side evaporator.

6. The refrigerant cycle device according to claim 5, wherein the refrigerant passage is provided with a check valve for allowing the refrigerant to flow only from the vapor/liquid separator toward the suction-side evaporator.

7. The refrigerant cycle device according to claim 1, further comprising an internal heat exchanger for exchanging heat between the refrigerant to be sucked into the compressor and the refrigerant flowing from an outlet side of the second radiator.

8. The refrigerant cycle device according to claim 1, wherein the branch portion, the first radiator, and the second radiator are provided in an integrated structure.

9. The refrigerant cycle device according to claim 1, wherein:
   the branch portion separates the flow of refrigerant discharged from the compressor into a first flow going to the first radiator and a second flow separate from the first flow going to the second radiator; and
   the first flow and the second flow remain separate from each other until being mixed in the diffuser portion of the ejector.

10. The refrigerant cycle device according to claim 1, wherein the branch portion always provides the refrigerant to both the first radiator and the second radiator.

11. The refrigerant cycle device according to claim 1, wherein the branch portion always provides a first and a second flow of refrigerant.

12. The refrigerant cycle device according to claim 1, wherein an enthalpy of the refrigerant at the refrigerant outlet of the first radiator is higher than an enthalpy of the refrigerant at a refrigerant outlet of the second radiator.

13. A refrigerant cycle device comprising:
   a compressor for compressing and discharging refrigerant;
   a branch portion for branching a flow of the refrigerant discharged from the compressor into a first flow and a second flow separate from the first flow;
   a first radiator for radiating heat from only the first flow of refrigerant;
   an ejector including a nozzle portion for decompressing and expanding the refrigerant in only the first flow of refrigerant, the ejector being disposed immediately downstream from the first radiator, the ejector further including a refrigerant suction port for sucking the refrigerant from only the second flow of refrigerant by high-velocity flow of refrigerant from the first flow of refrigerant jetted from the nozzle portion, the ejector further including a diffuser portion for mixing the refrigerant from the first and second flows of refrigerant and for increasing a pressure of the mixed refrigerant;

a second radiator for radiating heat from only the second flow of refrigerant;

a throttle device for decompressing and expanding the refrigerant in only the second flow of refrigerant, the throttle device being disposed downstream from the second radiator; and first refrigerant piping through which the refrigerant flowing out of the first radiator flows into the nozzle portion;

second refrigerant piping through which the refrigerant flowing out of the second radiator flows into the throttle device, the second refrigerant piping being provided independently from the first refrigerant piping and beginning at an outlet of the second radiator; and a suction side evaporator for evaporating the refrigerant from only the second flow of refrigerant, the suction side evaporator having an inlet in direct communication with the throttle device and an outlet in direct communication with the refrigerant suction port of the ejector; wherein the first radiator and the second radiator are disposed on a downstream side of the branch portion such that an amount of heat radiated from the refrigerant in the first radiator is smaller than an amount of heat radiated from the second radiator; and the first radiator is configured to cool the refrigerant flowing therein such that the refrigerant at a refrigerant outlet of the first radiator is in a gas-liquid two-phase state and the refrigerant in the gas-liquid two-phase state flows into the nozzle portion.

14. The refrigerant cycle device according to claim 13, wherein an area of a heat radiation portion of the first radiator for allowing the refrigerant to radiate heat is smaller than that of a heat radiation portion of the second radiator for allowing the refrigerant to radiate heat.

15. The refrigerant cycle device according to claim 13,
wherein the second radiator is a heat exchanger for exchanging heat between the refrigerant passing through an inside thereof and air passing through an outside thereof, and
wherein the first radiator is a heat exchanger for exchanging heat between the refrigerant passing through an inside thereof and the air after being heat-exchanged in the second radiator.

16. The refrigerant cycle device according to claim 13, further comprising an outflow-side evaporator for evaporating the refrigerant flowing out of the diffuser portion.

17. The refrigerant cycle device according to claim 13, further comprising:

a vapor/liquid separator for separating the refrigerant on a downstream side of the diffuser portion into vapor-phase refrigerant and liquid-phase refrigerant to allow the vapor-phase refrigerant to flow to a suction side of the compressor; and a refrigerant passage for guiding the liquid-phase refrigerant to the downstream side of the throttle device and to an upstream side of the suction-side evaporator.

18. The refrigerant cycle device according to claim 17, wherein the refrigerant passage is provided with a check valve for allowing the refrigerant to flow only from the vapor/liquid separator toward the suction-side evaporator.

19. The refrigerant cycle device according to claim 13, further comprising an internal heat exchanger for exchanging heat between the refrigerant to be sucked into the compressor and the second flow of refrigerant flowing from an outlet side of the second radiator.

20. The refrigerant cycle device according to claim 13, wherein the branch portion, the first radiator, and the second radiator are provided in an integrated structure.

21. The refrigerant cycle device according to claim 13, wherein an enthalpy of the refrigerant at the refrigerant outlet of the first radiator is higher than an enthalpy of the refrigerant at a refrigerant outlet of the second radiator.

* * * * *